(No Model.)
W. T. JEBB.
METHOD OF AND APPARATUS FOR MANUFACTURING DISTILLED SPIRITS FROM GRAIN.
No. 254,330.   Patented Feb. 28, 1882.
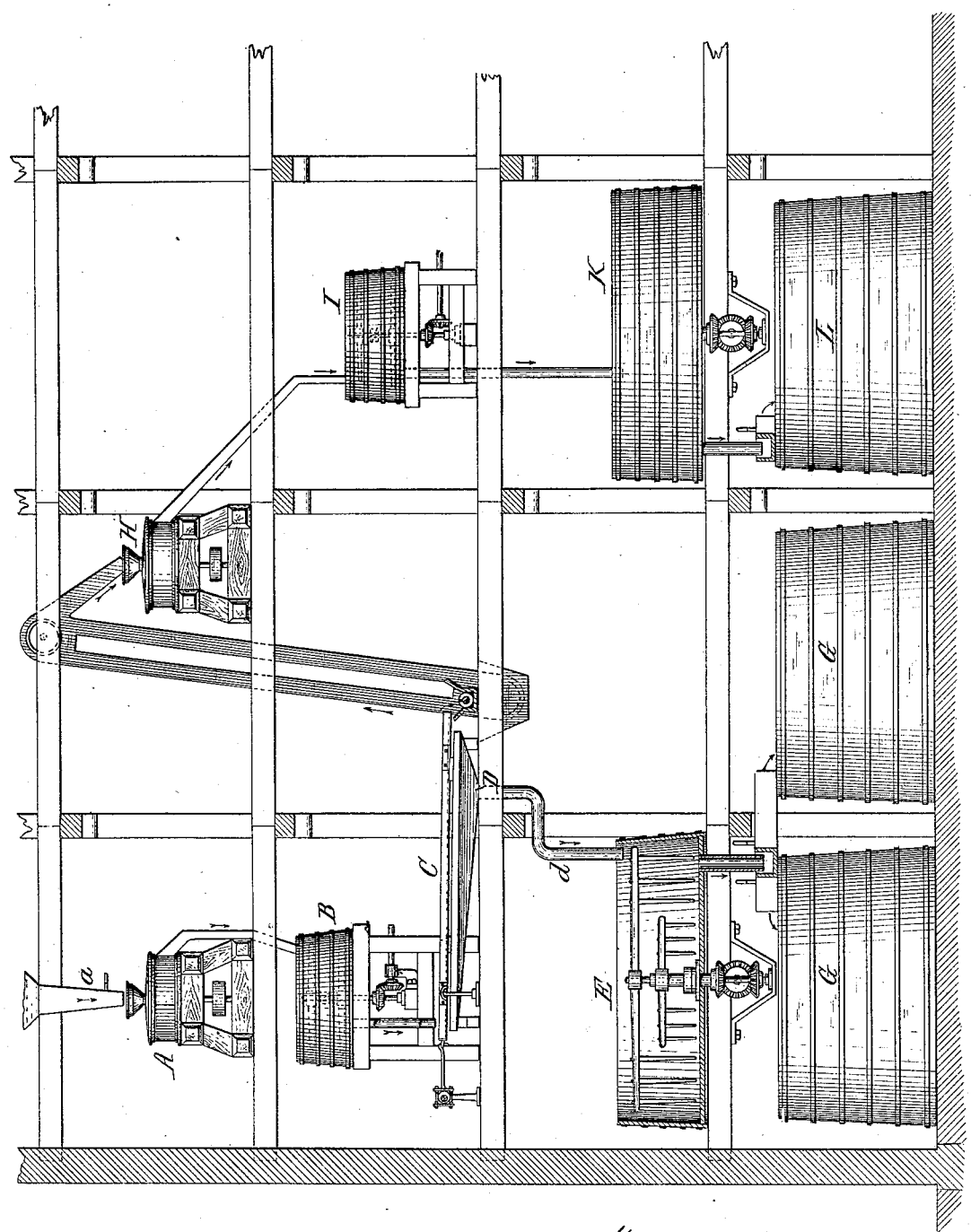
Chas. J. Buchheit
Edw. J. Brady } Witnesses.
William T. Jebb, Inventor.
By Wilhelm & Bonner
Attorneys.

United States Patent Office.

WILLIAM T. JEBB, OF BUFFALO, NEW YORK.

METHOD OF AND APPARATUS FOR MANUFACTURING DISTILLED SPIRITS FROM GRAIN.

SPECIFICATION forming part of Letters Patent No. 254,330, dated February 28, 1882.

Application filed January 24, 1882. (No model.)

*To all whom it may concern:*

Be it known that I, WILLIAM T. JEBB, of the city of Buffalo, in the county of Erie and State of New York, have invented a new and useful Improvement in the Method of and Apparatus for Manufacturing Distilled Spirits from Grain, of which the following is a specification.

This invention relates to an improvement in the art of producing distilled spirits from grain, and more especially to a method of treating the grain, in which the bran is first separated from the starchy portions of the grain, and the latter are mashed, fermented, and distilled alone, whereby the contamination of the spirits with fusel-oil and other deleterious substances contained in or derived from the outer portions of the grain is to a large extent avoided, and the offal or feed preserved in a more useful condition, as more fully described in Letters Patent of the United States No. 243,910, granted to Thomas A. Jebb and myself July 5, 1881.

The object of the present invention is to utilize for the production of spirits the starchy and other useful matter which may adhere to or be mingled with the separated bran; and my invention consists, to that end, principally in mashing, fermenting, and distilling the separated bran, whereby the spirits produced therefrom are recovered as a separate product, and the contamination of the main portion of the spirits with this inferior quality of spirits is avoided.

The accompanying drawing represents a sectional elevation of the apparatus employed in manufacturing spirits according to my improved method.

A represents a grinding-mill or other reducing apparatus which receives the grain from a spout, *a*. The latter connects with a steep-tub, preferably of the construction shown and described in Letters Patent of the United States No. 240,907, granted to Thomas A. Jebb and myself May 3, 1881, and in which the grain is softened before it is fed to the reducing apparatus A.

B is a receiving-tub, which collects the ground grain from one or more of the mills A, and which is provided with a rotating stirrer or other suitable agitator, whereby the material is thoroughly mixed.

C is a shaking or other suitable separator, which receives the ground grain from the agitating-tub B, and whereby the starch-water is separated from the bran and other coarse material, the starch-water passing through the meshes of the shaking-sieve and the coarse material escaping over the tail thereof. The starch-water is collected in a trough, D, under the sieve, and conducted by a pipe, *d*, either directly to the mash-tub E or to a suitable receiver, from which it is drawn from time to time into the mash-tub. In the latter the starch-water is mixed with the requisite quantity of crushed malt, small grains, or glucose, and mashed in a well-known manner. The mash is discharged into the fermenting-tubs G, from which the fermented beer is conducted to the still, in which the spirits are distilled off, as usual.

H represents a grinding-mill or other reducing apparatus which receives the bran and other coarse matter from the separator C, and in which this material is further reduced, if this is found necessary.

I is an agitating-tub which receives the material from the grinding-mill H, and in which the material is first thoroughly mixed and then discharged into a mash-tub, K. In the latter tub the material is mashed separately and then conducted into separate fermenting-tubs L, from which the fermented material is drawn off and distilled separately.

It is obvious that the mash-tub E and the fermenting-tubs G may be employed for mashing and fermenting the bran, if the operations of mashing and fermenting the starch-water and the bran are carried on alternately.

By my improved method the greater portion of the spirit-producing elements of the grain is first separated from the bran, and the spirits produced from this portion of the material are therefore free from the deleterious substances which are liberated during the fermentation and distillation of the bran. As the latter is, however, mashed, fermented, and distilled, the useful substances contained therein are also utilized and recovered in the form of an inferior quality of spirits, which are more or less contaminated by the deleterious substances referred to, and which have to be removed by rectification. However, the loss of any portion of the spirits-producing constituent parts of the grain is avoided, and the full yield of spirits is obtained.

I claim as my invention—

1. As an improvement in the art of manufacturing distilled spirits from grain, the herein-described method, which consists in first moistening the grain, then reducing it, then separating the starchy portion of the grain from the bran, and then mashing, fermenting, and distilling the starchy portions and the bran separately, as set forth.

2. As an improvement in the art of manufacturing distilled spirits from grain, the herein-described method, which consists in first moistening the grain, then reducing it, then separating the starchy portion of the grain from the bran, then mashing, fermenting, and distilling the starchy portions, then regrinding the bran, and mashing, fermenting, and distilling the ground bran separately, substantially as set forth.

3. In an apparatus for manufacturing distilled spirits from grain, the combination of a suitable grinding-mill whereby the grain is reduced, a receiving-tub, a separator whereby the bran and other coarse offal is separated from the starchy substances, a receiver in which the starchy substances are collected, a suitable conveyer for the bran and other coarse offal, a regrinding-mill therefor, and suitable mash and fermenting tubs, and connecting-conduits, substantially as set forth.

WILLIAM T. JEBB.

Witnesses:
JOHN TULLY,
WADE ANDREWS.